Sept. 2, 1930.  L. SICHEL  1,775,000
PORTABLE GRINDING AND MILLING MACHINE
Filed Oct. 17, 1928   2 Sheets-Sheet 1
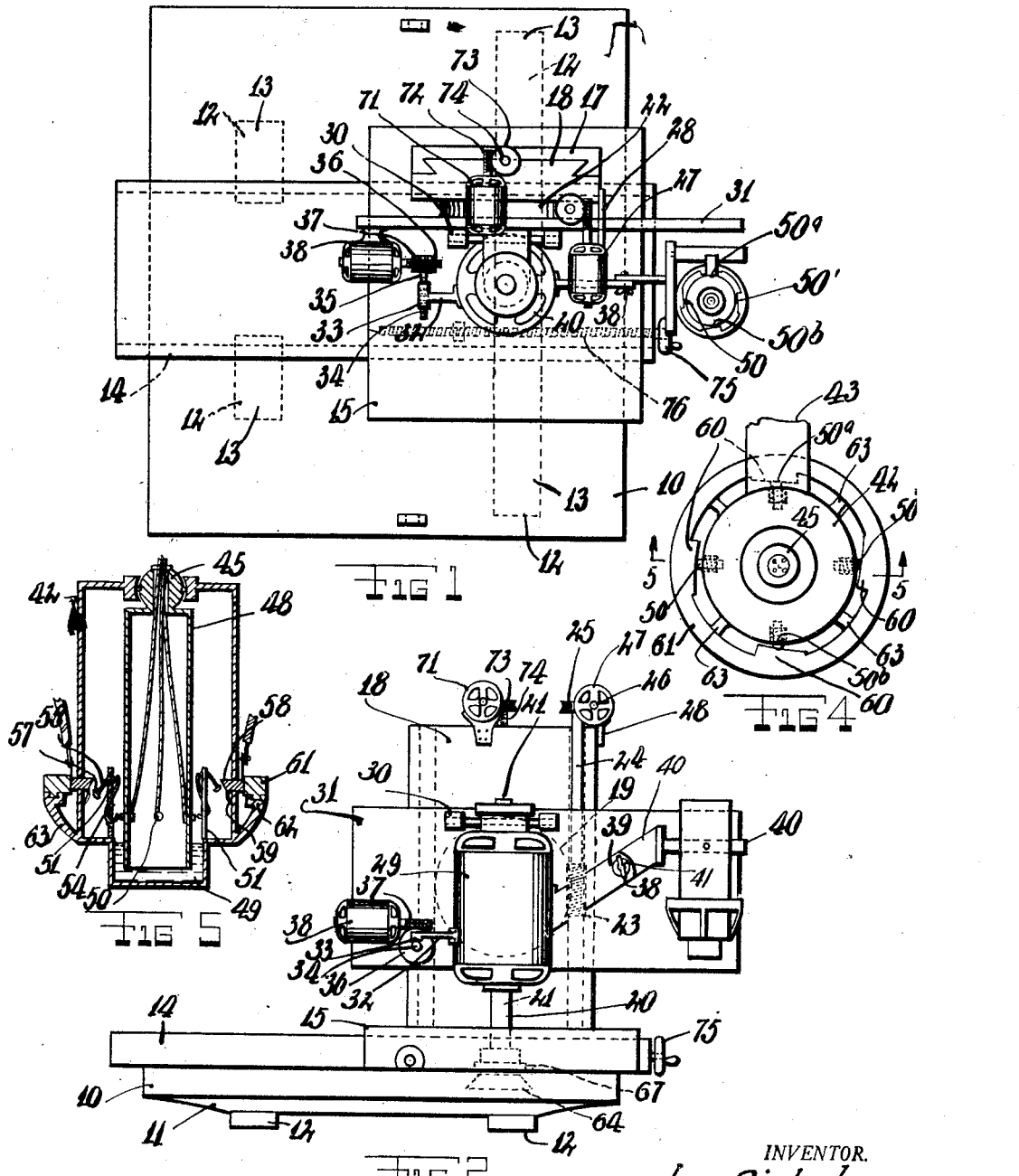
INVENTOR.
Leo Sichel Sept. 2, 1930.  L. SICHEL  1,775,000
PORTABLE GRINDING AND MILLING MACHINE
Filed Oct. 17, 1928  2 Sheets-Sheet 2
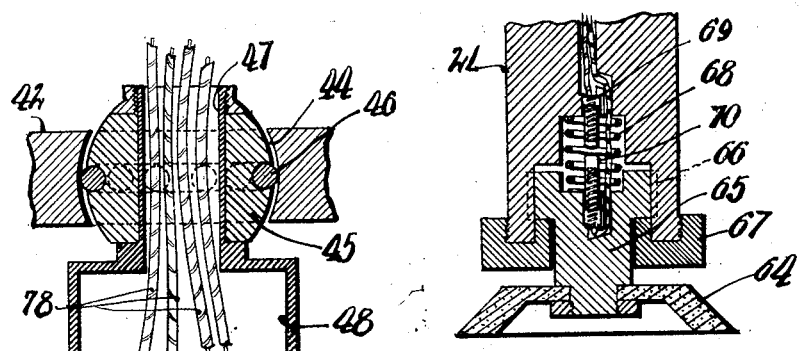
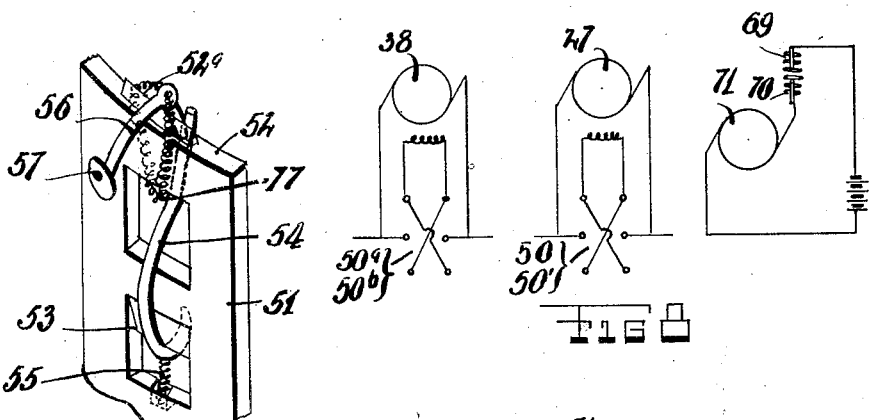
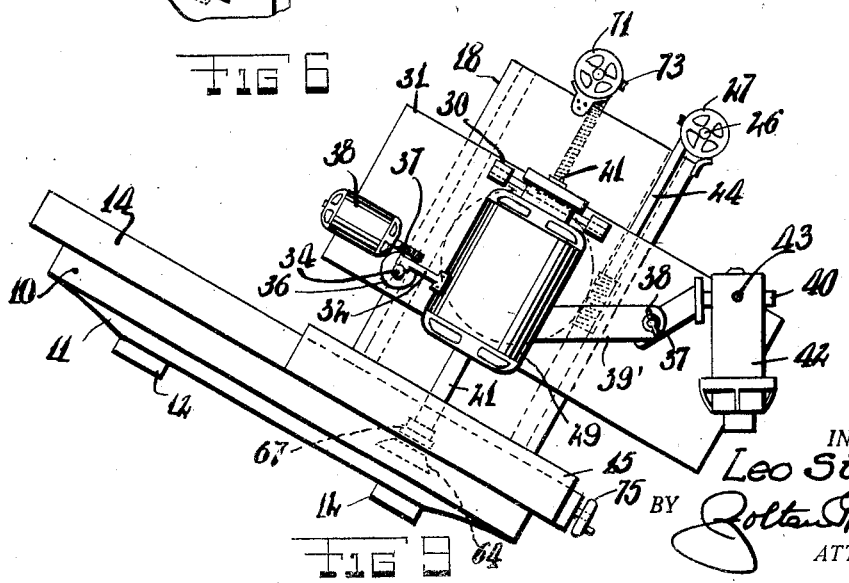
INVENTOR.
Leo Sichel
BY
ATTORNEY Patented Sept. 2, 1930

1,775,000

UNITED STATES PATENT OFFICE

LEO SICHEL, OF ST. GEORGE, NEW YORK

PORTABLE GRINDING AND MILLING MACHINE

Application filed October 17, 1928. Serial No. 313,004.

This invention relates generally to grinding machines and has more particular reference to a novel portable grinding and milling machine.

The invention has for an object the provision of a device of the class mentioned which is of simple durable construction, desirable in use and efficient in action, and which can be manufactured and sold at a reasonable cost.

In the finishing by grinding of guide ways or flat bearings for machine tools such as lathes, planers, millers etc. as well as for the milling operation prior to grinding of such surfaces, very heavy and expensive machinery has hitherto been used. Especially as regards the finishing operation by grinding of flat bearings on said machinery the equipment used for this purpose in the past has been applicable to work of comparatively restricted dimensions since for larger work such as for instance beds of large planers or lathes it is difficult or at least extraordinarily expensive to design and make conventional machinery to cover the required work dimensions inasmuch as a very high degree of accuracy is required in such machines.

An object of this invention is to do away with the conventional type of machinery in all such cases where it is more advantageous to use the said invention which is principally the case on all work of medium and large size.

In machinery of this kind it is necessary to generate, by milling or grinding, adjacent surfaces such as guide ways which are true for parallelism and straightness of surface and prior to starting on the grinding operation it becomes necessary to align the work to the grinding wheel in order to obtain a working level and reproduce as far as possible the accuracy of the machine on the work and to perform the operation in the minimum of time.

In order to obtain the same result without resorting to expensive and heavy machinery I employ a portable apparatus which can be located on the workpiece itself on which the same is to operate thus reducing all mechanism to a minimum. For this purpose all that is required is an apparatus provided with the mechanisms to allow of and give the necessary adjusting and feeding movements to the tool which is a grinding wheel actuated on a preferably directly motorized grinding head. If employed for milling, a milling cutter, preferably of the end type is used and a reduction of the cutter spindle speed must be brought about by suitable means for instance thru gearing in order to obtain the correct cutting speed. By suitably locating and positioning my portable machine on the workpiece, for instance a planer bed, I can set my wheel to the work in both the longitudinal and transverse horizontal plane and by rotating and by feeding the wheel vertically a suitable amount, whilst reciprocating the apparatus on the work I am enabled to grind down on the planer way in order to plane or level the same.

However, will I obtain a straight surface in both the longitudinal and transverse horizontal directions I must whilst reciprocating or moving the portable machine along the bed of the planer continually make adjustments on the grinding head to obtain said correct plane position of the grinding wheel in both directions since the ways of the planer or lathe etc. bed are not true in themselves but present irregularities along their surface which is either that of a rough, chipped, planed or a casting that has been treated by a coarse previous machining operation.

But should I make these adjustments by hand this method would not result in a satisfactory operation since I would have to test for a plane and reset my grinding head accordingly on each successive step of movement along the planer bed in order to compensate for the said irregularities of the work and this would consume undesirable time. Furthermore by grinding to a finished surface the ways of a machine by a machine located on these same ways it is hardly possible to align the workpiece to a given working level but an approximately level position of the work is all that can be reckoned with in actual working condition. Under the circumstances it becomes necessary to attach to the portable machine a reference standard of level which can be trusted to give an exact control of the plane in both directions during the entire operation and which can be set to this standard at the beginning of the operation regardless of the general plane in which the workpiece or the surfaces to be machined may be located at the beginning of the operation.

Furthermore it is desirable to have this reference standard of level or plane perform by power and automatically the desired adjustments on the grinding wheel or grinding head since as mentioned before to perform these adjustments by hand would consume far too much time.

The means for performing this task can be of different kinds, I however prefer an apparatus which while giving a standard reference level will at same time either open or close an electrical power circuit which in turn will perform the adjustments on the grinding head and this automatically at each and every stage of the machining operation all along the workpiece. Such an apparatus may be a pendulum which by gravity always finds the same level or plane or it may be a spirit level in which an air bubble always tends to find its highest point or it may be a combination of one or more such apparatus which may be advantageous for range of operation, sensitiveness and magnitude of control as to direction.

By magnitude of control I mean for instance the combination of two or more levels or the suitable arrangement of a pendulum to control both the longitudinal and transverse directions instead of only one of them.

For further comprehension of the invention, and of the objects and advantages thereof, reference will be had to the following description and accompanying drawings, and to the appended claims in which the various novel features of the invention are more particularly set forth.

In the accompanying drawing, forming a material part of this disclosure:—

Fig. 1 is a plan view of a device constructed according to this invention.

Fig. 2 is a front elevational view thereof.

Fig. 3 is an enlarged detail vertical sectional view of the upper portion of the pendulum used in the device.

Fig. 4 is a fragmentary view of the pilot control of the device, this being an enlarged detail view of a portion of Fig. 1.

Fig. 5 is a vertical sectional view, taken on the line 5—5 of Fig. 4; certain parts not being shown in section.

Fig. 6 is a fragmentary perspective detail view of the knife edges used in supporting the contact levers of the pilot.

Fig. 7 is a fragmentary vertical sectional view of the lower end of the grinding head.

Fig. 8 is a schematic wiring diagram of the electrical connections of the device.

Fig. 9 is a view similar to Fig. 2, but disclosing a modification thereof.

The reference numeral 10 indicates generally a saddle having a bottom projection 11 and which are fastened with gauge blocks 12, preferably rounded off at the ends as at 13. Guide ways 14 project from the saddle 10 and a transverse slide 15 is mounted on these guide ways. A guide 17 projects vertically from the saddle and a slide 18 is mounted on this guide.

The slide 18 is provided with a swivel plate 19 and a motorized grinding head 20 is mounted on this swivel plate. This grinding head has two projecting spindles 21. The swivel plate 19 is provided with worm teeth 22 meshing with a worm 23 keyed on a vertical shaft 24 provided at its top with a worm wheel 25 meshing with a worm 26 on the shaft of a small electric motor 27. This motor is supported on the slide 18 by a lug or bracket 28.

The motorized grinding head 20 includes an electric motor 29 which is hingedly mounted as at 30 on a plate 31, which plate firmly connects with the swivel plate 22. An arm 32 is attached to the motor 29 and at its free end is formed with a segment of a worm wheel 33 meshing with a worm 34 on a shaft 35 provided with a second worm wheel 36 meshing with a worm 37 on the shaft of a small electric motor 38. This electric motor is secured upon the plate 31.

An arm 39 projects from the side of the motor 29 and an auxiliary arm 40 is pivotally connected with the free end of arm 39 as at 41. A container 42 is pivotally connected as at 43 onto the auxiliary arm 40 so that the container may pivot in a vertical plane about 43, and further pivots in a vertical plane at right angles to the said plane at 41. This container houses the control pilot of the device.

The container 42 is provided with a spherical recess 44 at its top end engaged by a spherical ball race 45 provided with steel balls 46. The ball race 45 has a central aperture thru which the top end 47 of a pendulum 48 is securely mounted. The lower end of the pendulum projects into a damping fluid 49 held in the bottom of the container 42. Four groups of contacts are mounted in the sides of the pendulum 48 and spaced 90 degrees apart at regions 50, 50′, 50$^a$ and 50$^b$ and so arranged that planes passing thru opposite pairs of these regions are parallel and at right angles respectively to the plate 31. Projecting from the base of the container 42 and in the vicinity of the regions stated are four plates 51 and each of these plates is provided with a top knife edge 52 and a lower knife edge 53. Contact arms 54 engage against the knife edges 53 by reason of springs 55 and one of the ends of the contact arms are arranged for engagement with the contacts in the stated regions while the other ends are engaged by auxiliary contact arms 56 acting against the knife edges 52 and are provided with contact heads 57. A spring 77 acts to keep the auxiliary contact arm 56 against the knife edge 52. A plurality of leads 78 pass thru the top of the pendulum 48 as seen in Fig. 3 and connect with the contact regions before stated.

Contacts 58 are slidably arranged thru the sides of the container 42 and are aligned with the contact heads 57. The contacts 58 are normally urged out of the container by springs 59 and are held against the action of these springs by cam pieces 60 fixed on an adjusting ring 61 rotatively mounted in a stationary ring 62 supported upon the container 42 by arms 63. By rotating adjusting ring 61 the cam pieces 60 will either approach or remove contacts 58 with respect to contact heads 57 thus increasing or diminishing the sensitiveness of the pendulum pilot device.

The grinding head is provided with a grinding wheel 64 fixed on a stub shaft 65 slidably held within the spindle 21 by reason of grooves and keys 66, and arranged for rotating with the spindle and capable of moving endwise. A nut 67 holds the stub shaft 65 against displacement and allows of adjustment. An expansion spring 68 acts between the spindle 21 and the stub shaft 65 for normally urging these apart, and contacts 69 and 70 are respectively mounted on the spindle and stub shaft. Should the grinding tool 64 pass over an irregularity it will be forced upwards for closing the contacts 69 and 70 shown in Fig. 8 and an electrical circuit will be closed thru a motor 71. This motor 71 is mounted on the top of the slide 18 and is provided with a worm 72 meshing with a worm gear 73 fixed on a screw 74 arranged for moving the slide 18 upwards and thus relieving the excessive cutting pressure due to the irregularity. A means for feeding the spindle 21 downwards by hand must be provided.

A hand wheel 75 is arranged for moving the slide 15 manually by nut and screw 76 when desired.

As the grinding head moves from its originally set plane or angle the pendulum will tilt and cause one of the contact regions to connect with a specific contact lever 54. It is pointed out that the slightest movement on the part of the pendulum will cause quite a large movement at the contact head 57. The damping fluid 49 tends to hold the pendulum against vibration, but allows it to move in the event that the device is tilted. More specifically stated and referring to Fig. 1, the contact region 50 is illustrated to the left, region 50' diametrically opposite to the right, region 50$^a$ at right angles to a plane thru these contacts and to the rear, and region 50$^b$ diametrically opposite region 50$^a$ and to the front. Assuming that the grinding head tilts so that the pendulum causes region 50 to connect with its contact arm 54, then an electrical circuit will be closed thru motor 27. Rotation of the motor is transmitted to the swivel 19 and turns the grinding head back into true position. In the event that the pendulum is tilted for closing the contact region 50' an electrical circuit will be closed thru the motor 27 for allowing the motor to rotate in the opposite direction than it just did and turn the device for again turning the grinding head back to true position. As seen in Fig. 8 the regions 50 and 50' constitute a reversing switch for reversing the motor 27.

In the event that the device moves off of its plane so that the pendulum causes the contact region 50$^a$ to connect with its contact arm 54 then an electrical circuit will be closed thru the motor 38 for energizing it and causing the grinding head 29 to move about its hinged point back into true position. Should it tilt in the opposite direction so that the contact region 50$^b$ be closed against its arm 54 then the motor 38 will be caused to operate in the opposite direction for moving the grinding head in the opposite direction also.

In the modified form of the device illustrated in Fig. 9, the arm 39' is shown of two sections pivoted together at 37 and held in any desired angular position by a wing screw 38. With this arrangement the grinding head may be set at any angularly inclined position while the pendulum maintains a vertical position between the contact arms 54. In operation, should the grinding head move off of its true line the pendulum will swing for closing the circuits as before described and moving the grinding head back into true line. In order to prevent continuous overregulation the small motors actuating the swivels are provided with magnetic braking effect or a suitable device is interposed to bring about the desired effect.

The operation of the apparatus is as follows. Supposing that it is required to finish by grinding the two adjoining guide ways of a planer bed such guide ways being for instance flat and of a given width, gauge blocks 12 will be attached to the undersurface of the portable machine in approximately the constellation shown in the drawing such pieces being preferably of the same or almost the same width as that of the ways on the workpiece. The machine is now on the work, positioned in place or on sections of the ways which have preferably been previously scraped or field or smoothened down in order to create an approximately smooth location from which to commence operations.

The wheel is now set to the work in both the longitudinal and transverse direction by suitable swivelling on the grinding head and traversing of the slide 15 and the portable machine moved along the bed at a suitable speed by suitable machinery whilst the grinding spindle revolves at a suitable speed. The constellation of the gauge or slide blocks is to be preferably chosen in such a manner that when the wheel is at the end of the work the portable machine still conserves a three surface bearing on the workpiece such as is given by three of the blocks, wholly or partly. In reversing and grinding to the other end of the work the same condition should obtain. When starting to grind it is understood that the grinding head may not occupy a level position on the workpiece which is not necessary either. All that is required is that the original plane or angle to which now grinding is being done is constantly adhered to during the whole operation until the surface obtained by grinding down on the work is true in both directions, longitudinally and transversely.

For this purpose the automatic control leveller is swung or pivoted in both directions until the pendulum is free and in middle or neutral position of the four contact pieces. When now in traversing the portable machine on the work-piece any irregularity is encountered in either of the above named directions the same will immediately have an effect on the portable machine which will be inclined in either or in both directions at the same time. This inclination will have a like effect on the automatic control leveller whose pendulum will swing in the same direction and by making contact with the contact pieces will establish the electrical power circuit that will readjust the grinding head to the former lever or angle. So soon as this angle is sufficiently re-established the pendulum will have regained its former position and the electric connection will be interrupted thus stopping the adjustment movement on the grinding head.

While traversing the portable machine by power on the workpiece it will be necessary for an operator to attend and make the desirable height adjustment of the grinding head on its slide so as not to unduly grind down on the work and either spoil it by heating effects or break the wheel by undue grinding pressure. On the contrary the operator will watch the work, and adjust the wheel for height whenever this appears desirable. Should it be desired, however, to render the operation of the machine still more automatic this can be done by adjusting the safety or wheel device which by raising the grinding head on too much grinding pressure being encountered, will reestablish a normal, previously adjusted grinding pressure.

While I have shown and described the preferred embodiment of my invention, it is to be understood that I do not limit myself to the precise construction herein disclosed and the right is reserved to all changes and modifications coming within th scope of the invention as defined in the appended claims.

Having thus described my invention, what I claim as new, and desire to protect by Letters Patent of the United States is as follows:—

1. In a device of the class described, a slide member slidably mounted on a base member, said slide member provided with an extended element having slidably mounted thereon a second slide member, an electric motor pivotally mounted on the said second slide member, an electric motor operatively connected by gearing to the said first mentioned motor as a means of swivelling the said first mentioned motor, a third electric motor operatively connected to the said first mentioned motor as a means of tilting the said first mentioned motor, a pendulum electrically connected to the said second and third motors as a means of maintaining the armature shaft of the said first mentioned motor in an adjusted position, a grinding wheel secured to the lower extremity of the said armature shaft.

2. In combination with a pendulum suspended free to hang in a collar, said collar in two directions in the vertical planes at right angles to each other pivotally attached to the extended element of a slide member, said pendulum operatively connected to a mechanism as a means of holding the armature shaft of an electric motor in an adjusted position, a grinding wheel secured to the said armature shaft, an electric motor operatively connected by gearing to the said first mentioned motor as a means of swiveling the said first mentioned motor, a third electric motor operatively connected to the said first mentioned motor as a means of tilting the said first mentioned motor, a pendulum electrically connected to the said second and third motors as a means of maintaining the armature shaft of the said first mentioned motor in an adjusted position, a grinding wheel secured to the lower extremity of the said armature shaft.

3. A pendulum suspended free to hang in a collar said collar in two directions in the vertical planes at right angles to each other pivotally attached to the extended element of a slide member, said pendulum operatively connected to a mechanism as a means of holding the armature shaft of an electric motor in an adjusted position, a grinding wheel secured to the said armature shaft an electric motor operatively connected by gearing to the said first mentioned motor as a means of swiveling the said first mentioned motor, a third electric motor operatively connected to the said first mentioned motor as a means of tilting the said first mentioned motor, a pendulum electrically connected to the said second and third motors as a means of maintaining the armature shaft of the said first mentioned motor in an adjusted position, a grinding wheel secured to the lower extremity of the said armature shaft.

4. In a device of the class described, a pendulum suspended in a collar as a means of completing an electric current to a motor and to a second motor, said first and second motors operatively connected to a third motor as a means of maintaining the armature shaft of the said third motor in an adjusted position, a grinding wheel secured to the extended extremity of the said armature shaft, the said first electric motor operatively connected by gearing to the said third mentioned motor as a means of swiveling the said third mentioned motor, the said second electric motor operatively connected to the said third mentioned motor as a means of tilting the said third mentioned motor, a pendulum electrically connected to the said first and second motors as a means of maintaining the armature shaft of the said third mentioned motor in an adjusted position, a grinding wheel secured to the lower extremity of the said armature shaft.

5. In combination with a pendulum mechanism, a slide member slidably mounted on a base member, said slide member provided with an extended element having slidably mounted thereon a second slide member, an electric motor tiltably mounted on the said second slide member, a second electric motor operatively connected by gearing to the said first mentioned motor as a means of swiveling the said first mentioned motor, a third electric motor operatively connected to the said first mentioned motor as a means of tilting the said first mentioned motor, a pendulum electrically connected to the said second and third motors as a means of maintaining the armature shaft of the said first mentioned motor in an adjusted position, a grinding wheel secured to the lower extremity of the said armature shaft.

6. In a device of the class described, a pilot leveling device adapted for gravity actuation and electrically operative, and a means for setting and automatically readjusting as determined by the pilot leveling device a grinding wheel or milling cutter to the originally adjusted plane position in a portable machine tool mainly intended for grinding or milling machine tool or other machinery guideways.

7. In a device of the class described, a pilot leveling device adapted for gravity actuation and electrically operative, and a means for setting and automatically readjusting as determined by the pilot leveling device a grinding wheel or milling cutter to the originally adjusted plane position in a portable machine tool mainly intended for grinding or milling machine tool or other machinery guideways, said means consisting of a pivotable grinding or milling spindle, and means for pivoting and tilting said spindle by the said gravity actuated pilot leveling device.

8. In a device of the class described, a pilot leveling device electrically operative, and a means for setting and automatically readjusting as determined by the pilot leveling device a grinding wheel or milling cutter to the originally adjusted plane position in a portable machine tool mainly intended for grinding or milling machine tools or other machinery guideways, said means consisting of a pivotable grinding or milling spindle, and means for pivoting and tilting said spindle by the said pilot leveling device.

In testimony whereof I have affixed my signature.

LEO SICHEL.